United States Patent [19]

Guazzo

[11] Patent Number: 4,601,536
[45] Date of Patent: Jul. 22, 1986

[54] CONNECTION FOR A SUBMERGED OPTICAL FIBER CABLE

[75] Inventor: Lucien Guazzo, Calais, France

[73] Assignee: Les Cables de Lyon, Clichy, France

[21] Appl. No.: 475,561

[22] Filed: Mar. 15, 1983

[30] Foreign Application Priority Data

Mar. 17, 1982 [FR] France ................. 82 04505

[51] Int. Cl.$^4$ .......................... G02B 6/36; G02B 6/38; G02B 6/44; H02G 3/00
[52] U.S. Cl. ................. 350/96.20; 350/96.21; 350/96.23; 174/68 R; 174/70 R
[58] Field of Search ............... 350/96.20, 96.21, 96.23, 350/96.10, 96.15, 96.22; 174/70 R, 70 S, 50, 50.5, 68 R, 72 A, 72 C

[56] References Cited

U.S. PATENT DOCUMENTS

| 4,295,707 | 10/1981 | Nakai et al. | 350/96.20 |
| 4,312,563 | 1/1982 | Mead | 350/96.20 |
| 4,317,000 | 2/1982 | Ferer | 174/70 R |
| 4,332,435 | 1/1982 | Post | 350/96.20 |
| 4,389,086 | 1/1983 | Furusawa et al. | 350/96.20 |
| 4,447,115 | 5/1984 | Guazzo et al. | 350/96.20 |

FOREIGN PATENT DOCUMENTS

| 56-85716 | 9/1981 | Japan | 350/96.20 |
| 0019706 | 2/1982 | Japan | 350/96.23 |
| 0073710 | 5/1982 | Japan | 350/96.20 |
| 2027932 | 2/1980 | United Kingdom | 350/96.20 |

Primary Examiner—William L. Sikes
Assistant Examiner—Akm Ullah
Attorney, Agent, or Firm—Sughrue, Mion, Zinn, Macpeak, and Seas

[57] ABSTRACT

A connection for connecting a submerged optical fiber line cable (1) to a housing (18) for equipment such as a repeater (17), said housing being provided with an optical fiber access cable (16). The line cable comprises an optical core containing optical fibers, an arch of steel wires surrounding the core, a copper tube swaged down over the arch, and an insulating sheath over the copper tube. The end of said line cable is fixed to a connection piece by means of a conical ring and a plug of hardenable resin. The connection includes a magazine (15) for storing excess lengths of said optical fibers, and said access cable is constituted by a tube inside which the optical fibers extend freely.

7 Claims, 12 Drawing Figures

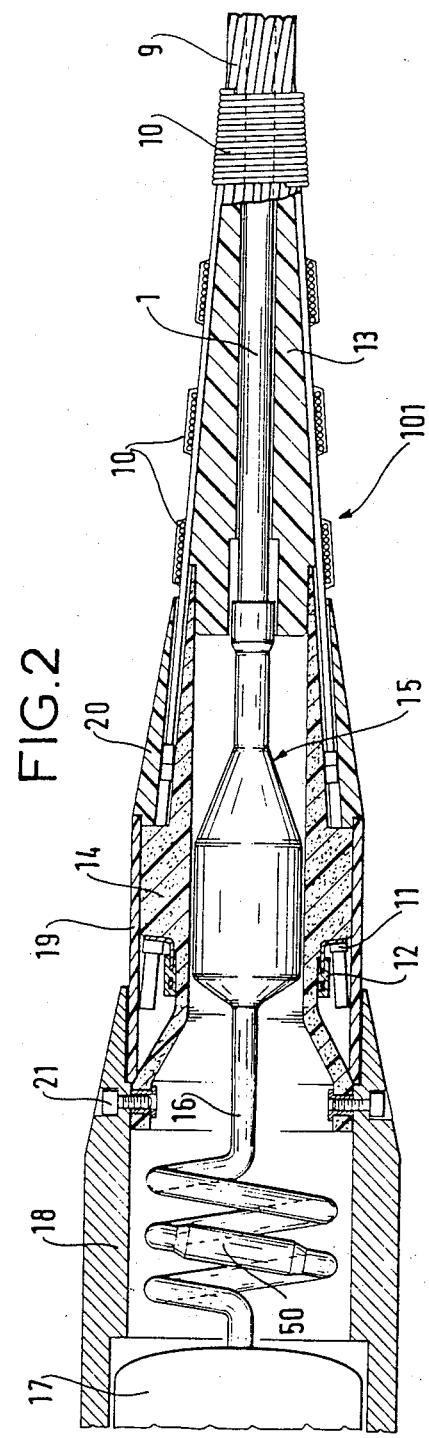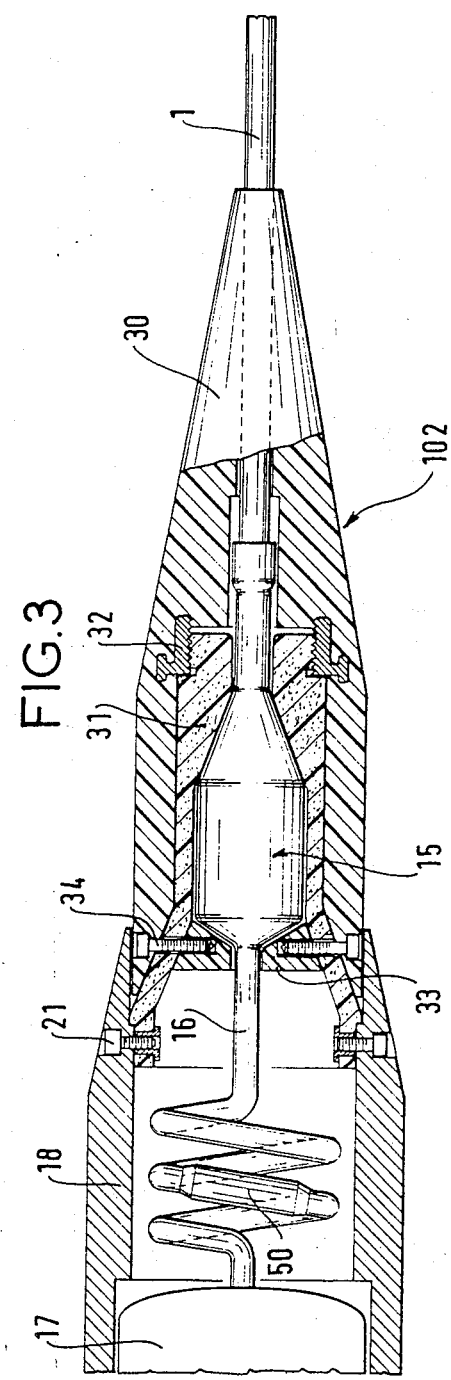

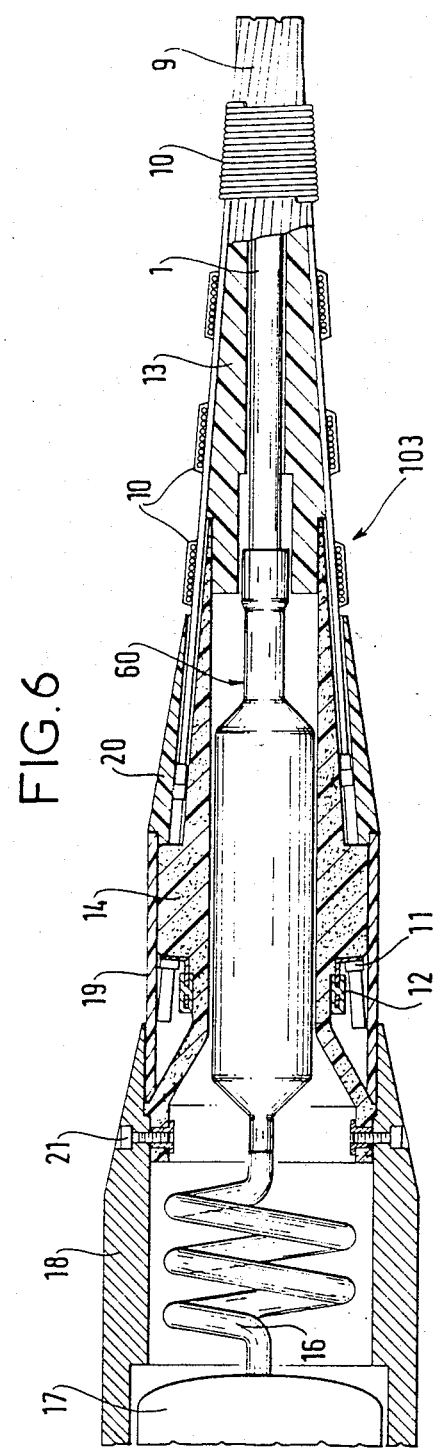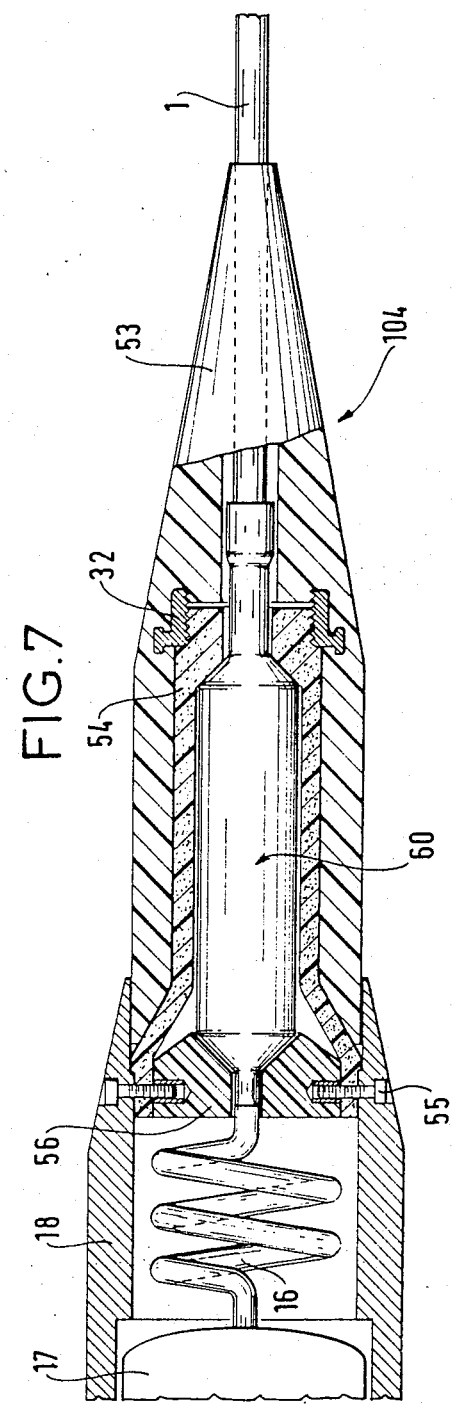

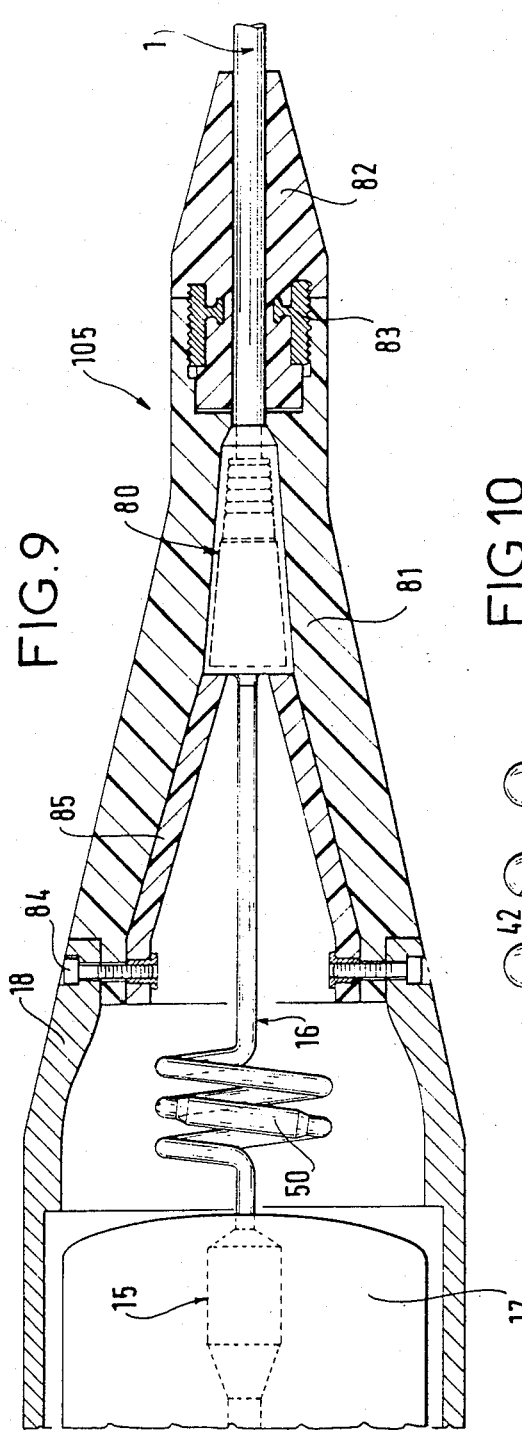
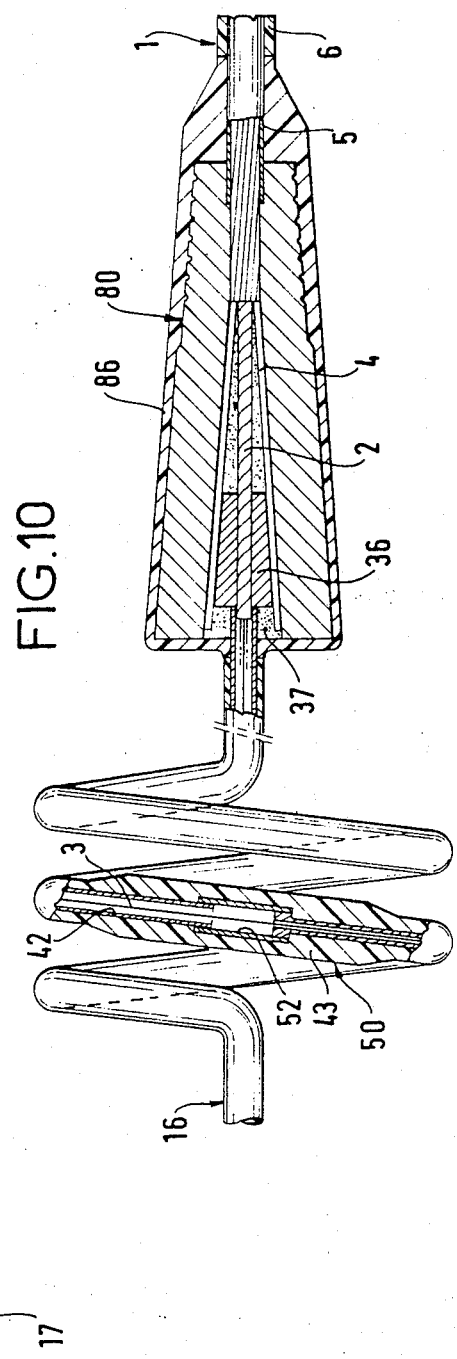

CONNECTION FOR A SUBMERGED OPTICAL FIBER CABLE

The present relates to a connection for connecting a submerged optical fiber line cable to a housing for equipment such as a repeater, said housing being provided with an optical fiber access cable, and said line cable comprising an optical core containing optical fibers, an arch of steel wires surrounding the core, a copper tube swaged down over the arch, and an insulating sheath over the copper tube; the end of said line cable being fixed to a connection piece by means of a conical ring and a plug of hardenable resin.

BACKGROUND OF THE INVENTION

Such connections serve as a interfaces between the repeaters and the line cable in a submerged telecommunications link, eg. an optical fiber telephone cable under the sea.

For manufacturing reasons, the repeaters and the line cable are not joined together until a final assembly stage.

With optical fiber cables, this final assembly operation requires the connection to include means for taking up the excess lengths of fibers which are necessary for joining optical fibers.

In shallow waters, eg. in depths down to about 400 meters (m), it is necessary to protect the line cable with steel armoring and an outer sheath of thermo-plastic in order to reinforce the cable against accidental damage from fishing nets and anchors.

In depths greater than 400 m, armoring is not required.

Preferred embodiments of the present invention provide a cable head or connection for interconnecting an optical fiber line cable and a housing for equipment such as a repeater, said connection being capable of withstanding high mechanical forces without suffering damage, and being thoroughly watertight.

SUMMARY OF THE INVENTION

The present invention provides a connection for connecting a submerged optical fiber line cable to a housing for equipment such as a repeater, said housing being provided with an optical fiber access cable, and said line cable comprising an optical core containing optical fibers, an arch of steel wires surrounding the core, a copper tube swaged down over the arch, and an insulating sheath over the copper tube, the end of said line cable being fixed to a connection piece by means of a conical ring and a plug of hardenable resin, wherein the connection includes a magazine for storing excess lengths of said optical fibers, and wherein said access cable is constituted by a tube inside which the optical fibers extend freely.

Advantageously, a tapering sleeve is fitted over a portion of the protective sheath to limit cable bending close to the connection.

The magazine may be a box for storing slack in which the excess lengths of optical fiber are disposed, eg. by coiling.

Alternatively the magazine may be a mandrel around which said excess length of fibers is wound. The Applicants' French patent application No. 81 24514 describes such a device.

At depths where the cable is armored, the storage magazine and the connection piece should be free to move axially relative to the housing and the armoring which are rigidly connected together; however, at depths where the cable need not be armored, the storage magazine and the connection piece may be fixed to prevent their moving axially relative to the housing, or the slack box may be located inside the housing, the remainder of the connection then serving merely to ensure that the connection between the line cable and the access cable is not damaged by traction.

BRIEF DESCRIPTION OF THE DRAWINGS

Embodiments of the invention are described by way of example with reference to the accompanying drawings, in which:

FIG. 2 is a partially cut away side view of a connection between an armored line cable and a repeater. An assembly constituted by a connection piece and an optical fiber storage magazine is free to move axially in an anchor member so as to accommodate unusual traction forces being applied to the armoring. The cable thus has sufficient play to avoid being damaged under such circumstances. The magazine is in the form of a box for holding slack fiber.

FIG. 3 is a partially cut away side view of a cable without armor and its connection to a repeater forming another embodiment of the invention. In this case the connection piece and the storage magazine are held fast against axial movement.

FIG. 6 is a partially cut away side view of a connection between an armored line cable and a repeater forming yet another embodiment of the invention. An assembly constituted by a connection piece and an optical fiber storage magazine is free to move axially in an anchor member so as to accommodate unusual traction forces being withstood by the armoring. The cable thus has sufficient play to avoid being damaged under such circumstances. The magazine is in the form of a mandrel around which fibers are wound.

FIG. 7 is a partially cut away side view of a cable without armor and its connection to a repeater forming a further embodiment of the invention. In this case the connection piece and the storage magazine are held fast against axial movement, and the magazine is of the same mandrel type as shown in FIG. 6.

FIG. 9 is a partially cut away side view through a connection between a cable without armor and a repeater forming yet a further embodiment of the invention. In this case the connection piece is held against axial movement by a retaining piece, and the magazine comprises a box for holding slack located in the repeater.

FIG. 10 is partially cut away side view of a detail of FIG. 9 drawn to a larger scale and showing the connection piece and an access cable.

MORE DETAILED DESCRIPTION

Figure 1:
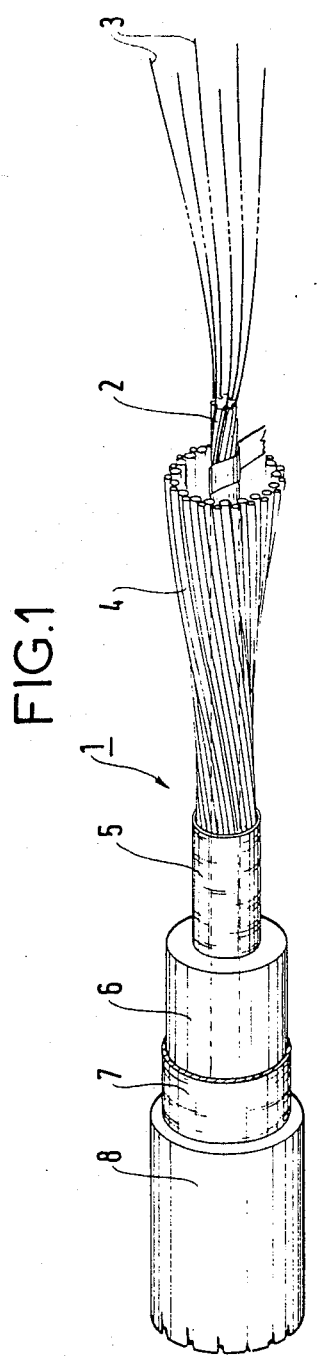
FIG. 1 is a perspective view of the end of an optical fiber line cable showing its component parts, and drawn approximately full scale.

FIG. 1 shows a line cable 1 comprising an optical core 2 containing optical fibers 3, an arch of steel wires 4, a tube of copper 5 swaged down onto the arch 4, an insulating sheath 6 of thermoplastic material, a return conductor 7, and an outer protective sheath of thermoplastic material.

In FIG. 2 the cable 1 is connected to a repeater 17 in a repeater housing 18. Beyond the cable head 101, ie. its connection to the repeater 17 and its housing 18, the cable 1 is protected by armor 9. The armor is made fast to a tapering sleeve 13 by whipping 10, and each strand of the armor is then individually fixed in an anchor piece 14 by a tubular cap 11 crimped to its end. Zinc anodes 12 prevent said caps 11 corroding. An assembly 15 comprises a connection piece and a storage magazine, and it is mounted free to slide axially in the anchor piece 14. A sheathed tube 16 leaving the assembly 15 constitutes an access cable to the repeater 17. The access cable 16 has three turns to permit axial displacement of the assembly 15, and a thickening 50 of its sleeve on one of the turns protects a boat joint, ie. a joint which is made during cable laying, and which is described further on.

A retaining cylinder 19 increases the stiffness of the connection between the anchor piece 14 and the repeater housing 18. The anchor piece is fixed to the housing 18 by bolts 21.

In FIG. 3 the line cable is not armored. Its connection 102 to the repeater 17 and its housing 18 is covered by a tapering sleeve 30 which prevents the cable from bending excessively. The sleeve 30 is screwed to an anchor piece 31 by means of a metal insert 32. The assembly 15 is prevented from moving axially in the anchor piece 31 by means of a plate 33 which is itself screwed to the anchor piece 31 by screws 34. The sheathed tube 16 leaving the assembly 15 consitutes an access cable to the repeater 17. The access cable has three turns to allow for axial movement, and a thickening 50 of its sleeve protects a boat joint described further on. The anchor piece 31 is fixed to the repeater housing 18 by bolts 21.

Figure 4:
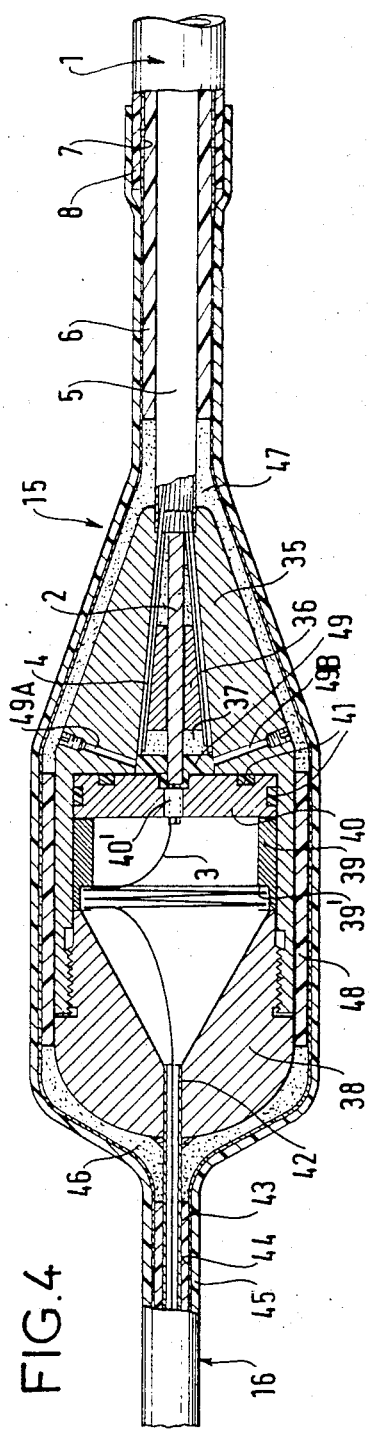
FIG. 4 is a section through the storage magazine shown in FIGS. 2 and 3 together with its associated connection piece.

In FIG. 4 it can be seen that the assembly 15 comprises a connection piece 35 fixed to the cable 1 by means of a conical ring 36 which is used to splay out the steel wires of the arch in a conical bore in the connection piece 35.

A plug 37 of hardenable resin blocks the connection of the steel wires of the arch to the connection piece. The assembly 15 further comprises a box 38 for taking up slack optical fiber. The box 38 is screwed into the connection piece 35 and sealing is provided by O-rings 41 mounted in a plate 40 which is pressed against the connection piece 35 by a ring 39. The plate 40 has a sealed hole 40' for passing the optical fibers. A gap between the sealed hole 40' and the plug 37 is filled with a filling 49 of polyisobutylene by means of two passages 49A and 49B which are then closed with respective stoppers. The ring 39 has a step 39' around its inside rim at its end away from the plate 40. The step 39' serves to receive a coil of optical fibers 3 roughly in the middle of the slack box 38, so that the fibers can have as large a radius of curvature as possible. The sheathed tube or fiber access cable 16 comprises: a small inner tube 42 which penetrates into the slack box 38 and which is welded thereto; an insulating sheath 43 of thermoplastic material; a return conductor 44; and an outer protective sheath. The three outermost layers (the sheath 43, the return conductor 44 and the outer sheath 45) are extended round the assembly 15 to the corresponding insulating sheath 6, return conductor 7, and protective sheath 8 of the cable 1. The insulating sheath 6 of the cable 1 is, in particular, extended via a first end moulding 46, a large diameter sheath round the slack box 38 and a second end moulding 47; all three of which could alternatively be made in one piece as a single moulding.

FIGS. 5A, 5B and 5C show the sequence of operations for joining the optical fibers. These operations take place at the thickenning 50. The tube 16 or fiber access cable is open in the middle of the thickening 50 and optical fiber is drawn out from each end. The two ends of fiber 3 are welded together end-to-end and the joint is protected by a sleeve 51. This is the stage reached in FIG. 5A. The slack fiber left over from this welding operation is then taken up in the slack box (FIG. 5B) with the sleeve 51 being received somewhere along the tube 42. Finally the tube 16 is reconstituted by the boat joint 52 with the various layers of the tube 16 being built up again in turn.

In FIG. 6, the cable 1 beyond the connection or cable head 103 is protected by armor 9. The armor is made fast to a tapering sleeve 13 by whipping 10, and each strand of the armor is then individually fixed in an anchor piece 14 by a tubular cap 11 crimped to its end. Zinc anodes 12 prevent said caps 11 corroding. An assembly 60 comprises a connection piece and a storage magazine, and it is mounted free to slide axially in the anchor piece 14. A sheathed tube 16 leaving the assembly 60 constitutes an access cable to the repeater 17. The access cable 16 has three turns to permit axial displacement.

A retaining cylinder 19 increases the stiffness of the connection between the anchor piece 14 and the repeater housing 18. The anchor piece is fixed to the housing 18 by bolts 21.

In FIG. 7 the cable is not armored. Its connection 104 to the repeater 17 and its housing 18 is covered by a tapering sleeve 53 which prevents the cable from bending excessively. The sleeve 53 is screwed to an anchor piece 54 by means of a metal insert 32. The assembly 60 is prevented form moving axially in the anchor piece 54 by means of a plate 56 which is itself screwed both to the anchor piece 54 and to the housing 18 by screws 56. The sheathed tube 16 leaving the assembly 15 constitutes an access cable to the repeater 17. The access cable has three turns to allow for axial movement.

Figure 8:
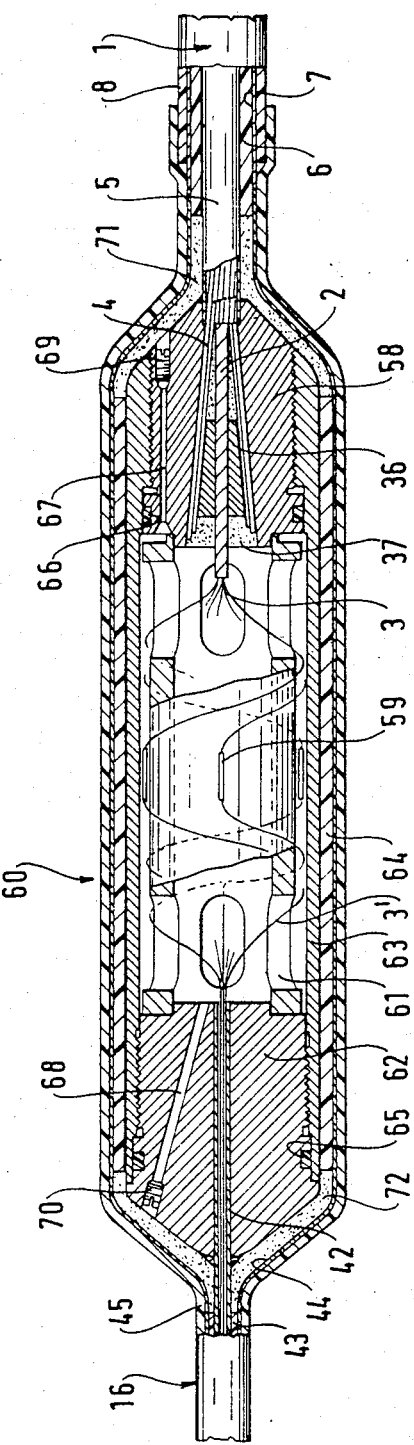
FIG. 8 is a section through the mandrel storage magazine shown in FIGS. 2 and 3 together with its associated connection piece.

In FIG. 8 it can be seen that the assembly 60 comprises a connection piece 58 fixed to the cable 1 by means of a conical ring 36 which is used to splay out the steel wires of the arch in a conical bore in the connection piece 58. A plug 37 of hardenable resin blocks the connection of the steel wires of the arch to the connection piece. Optical fibers 3, 3' are welded together in pairs, with the welds being protected by individual sleeves 59. The slack fiber is then wound around a mandrel 61. The inner tube 42 of the access cable 16 is engaged in a connection piece 62 and is welded thereto. The two connection pieces 58 and 62 are screwed into respective ends of a surrounding tube 63 which is previously fitted with an insulating sheath 64. The diameters are such that both connection pieces enter the tube from the same end; the repeater end in this case. Sealing is provided by O-rings 65 and 66. Orifices 67 and 68 serve to fill the mandrel with a viscous substance such polyisobutylene. Once the mandrel has been filled, the orifices are closed by stoppers 69 and 70. The insulating sheath 6 of the cable 1 and the insulating sheath 43 of the inner tube 42 are reconstituted by respective end mouldings 71 and 72 extending them to meet the sheath 64 on the tube 63. A return conductor 44 and its protective sheath 45 cover the sheath 43 and also the assembly 60 to be connected to the return conductor 7 and to its protective sheath 8 respectively.

In FIG. 9 the cable 1 is not armored. Its connection 105 to the repeater 17 and its housing 18 is covered by a tapering sleeve 82 which prevents the cable from bending excessively. The sleeve 82 is screwed to an anchor piece 81 by means of a metal insert 83. The cable 1 is locked in a connection piece 80, which is itself prevented from moving axially in the anchor piece 54 by means of a plate 56 which is itself screwed to the anchor piece 81 by means of a retaining member 85.

Polyethylene 86 is moulded over the connection piece 80.

Bolts 84 hold the cable head or connection 105 to the repeater housing 18. The storage magazine 15 is located inside the repeater 17; it is a slack box and is substantially identical to the one shown in FIG. 4. The access cable 16 has three turns to allow for axial movement, and a thickenning 50 in its sheath to protect a boat joint.

Figure 5:
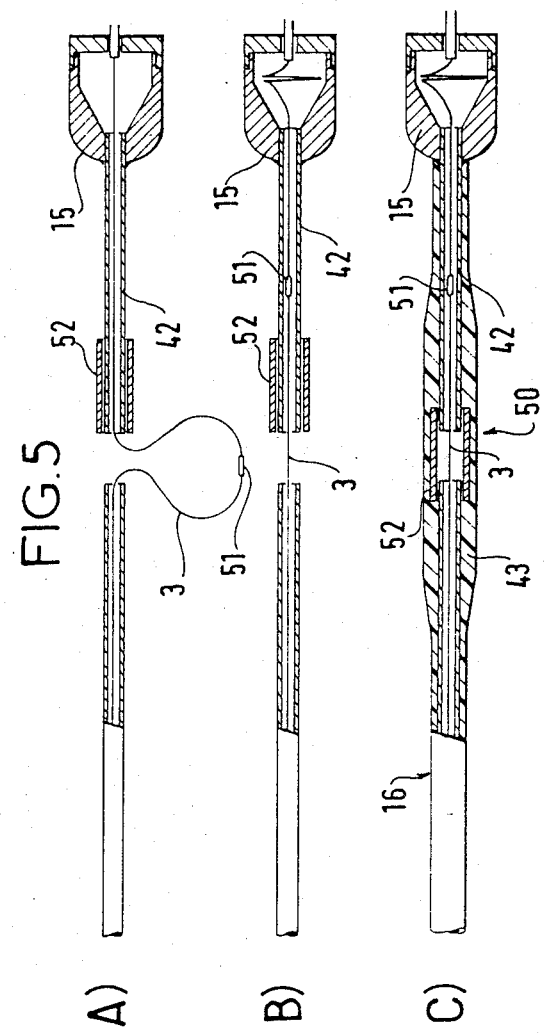
FIGS. 5A, 5B and 5C show a series of three stages in joining optical fibers when the storage magazine is a box for holding slack as shown in FIGS. 2 to 4.

In FIG. 10 it can be seen that the cable 1 is fixed to the connection piece 81 by means of a conical ring 36 which is used to splay out the steel wires of the arch in a conical bore in the connection piece 81. A plug 37 of hardenable resin blocks the connection of the steel wires of the arch to the connection piece. The inner tube 42 receives the optical fibers 3 and the fibers are joined as shown in FIG. 5. Once the boat joint 52 has been put into place, the tube is covered with a protective sheath 43 which is thicker over the joint. The protective sheath 43 is connected by a moulding 86 of polyethylene to the insulating sheath 6 of the cable 1. A return conductor and a protective sheath (not shown) cover the cable 1, the moulding 86 and the protective sheath 43.

It is not essential for a cable connection in accordance with the present invention to have such a return conductor and protective sheath.

I claim:

1. A connection for connecting a submerged optical fiber line cable to a housing for equipment such as a repeater, said housing being provided with an optical fiber access cable, and said line cable comprising an optical core containing optical fibers:

an arch of steel wires surrounding the core,
a copper tube swaged down over the arch, and
a protective insulating sheath fitted over the copper tube,
said connection comprising:
a hollow connection piece,
a end of said line cable being fixed to said connection piece by means of a conical ring interposed within the hollow connection piece and between the arch of steel wires and said hollow connection piece,
a plug of hardenable resin surrounding said core and abutting the ends of said arch of steel wires and the end of said concial ring,
a storage magazine for storing excess lengths of said optical fibers,
said access cable being constituted by a tube inside which the optical fibers extend freely,
said tube extending from said housing to said storage magazine and being connected at one end to said repeater and at the other end to said storage magazine;
whereby, said connection is capable of withstanding high mechanical forces without suffering damage and being thoroughly watertight.

2. A connection according to claim 1, wherein a tapering sleeve is fitted over the protective sheath to limit cable bending at the end of the connection.

3. A connection according to claim 1, wherein the magazine is a box for storing slack in which the excess lengths of optical fiber are taken up.

4. A connection according to claim 3, wherein the slack box includes an internal ring having an inside surface a step within said inside surface to receive coils of optical fiber substantialy in the middle of said slack box thereby enabling the radii of curvature of the fibers to be as large as possible.

5. A connection according to claim 1, wherein the storage magazine includes a mandrel around which said excess lengths of said fibers are wound.

6. A connection for connecting a submerged non armored optical fiber line cable to a housing for equipment such as a repeater, said housing being provided with an optical fiber access cable, said line cable comprising an optical core containing optical fibers, a protective insulating sheath fitted over said line cable, said connection comprising: a hollow connection piece, the end of said line cable being fixed to said connection piece, the improvement wherein said connection further includes a storage magazine for storing excess length of said optical fiber and wherein said access cable is constituted by a tube inside which the optical fibers extend freely, means for fixing the storage magazine and the connection piece prevent their moving axially relative to the housing, and wherein said access cable tube extends from said housing to said storage magazine and is connected at one end to said repeater and at the other end to said storage magazine; whereby, said connection is capable of withstanding high mechanical forces without suffering damage while being thoroughly watertight.

7. A connection for connecting a submerged optical fiber line cable to a housing including therein a repeater, said housing being provided with an optical fiber access cable coupled at one end to said repeater, said line cable comprising an optical core containing optical fibers, a protective insulating sheath fitted over said optical core, said connection comprising: a hollow connection piece, the end of said line cable being fixed to said connection piece, the improvement wherein said connection further includes a storage magazine for storing excess length of said optical fibers, and wherein said access cable is constituted by a tube inside which the optical fibers extend freely, said tube extending from said housing to said storage magazine and connected at one end to said repeater and at the other end to said storage magazine, said magazine constituting a box for storing slack in which the excess length of optical fibers are taken up, said slack box including an internal ring having a step on its inside surface to receive coils of optical fiber substantially in the middle of said slack box, thereby enabling the radii of curvature of the fibers to be as large as possible, said slack box is located inside said housing; whereby, the remainder of the connection serves to ensure that the connection between the line cable and the access cable is not damaged by traction, such that said connection is capable of withstanding high mechanical forces without suffering damage while being thoroughly watertight.

* * * * *